United States Patent [19]
Caulfield et al.

[11] Patent Number: 5,854,697
[45] Date of Patent: *Dec. 29, 1998

[54] WAVEGUIDE HOLOGRAM ILLUMINATORS

[75] Inventors: H. John Caulfield; Qiang Huang, both of Huntsville, Ala.; Andrei Putilin, Moscow, Russian Federation; Valentin Morozov, Boulder, Colo.; Joseph Shamir, Haifa, Israel

[73] Assignee: The University of Alabama in Huntsville, Huntsville, Ala.

[*] Notice: The term of this patent shall not extend beyond the expiration date of Pat. No. 5,515,184.

[21] Appl. No.: 473,966

[22] Filed: Jun. 7, 1995

Related U.S. Application Data

[63] Continuation of Ser. No. 902,881, Jun. 23, 1992, Pat. No. 5,515,184, which is a continuation-in-part of Ser. No. 790,516, Nov. 12, 1991, abandoned.

[51] Int. Cl.⁶ .............................. G03H 1/00; G02B 5/32; G02B 6/26
[52] U.S. Cl. .................... 359/34; 359/15; 385/32
[58] Field of Search ................. 359/15, 34, 19, 359/13, 9; 385/37, 32

[56] References Cited

U.S. PATENT DOCUMENTS

| | | |
|---|---|---|
| 4,400,616 | 8/1983 | Chevillat et al. ........................ 359/34 |
| 4,711,512 | 12/1987 | Upatnieks ................................. 359/15 |
| 4,830,442 | 5/1989 | Moss . |
| 4,946,253 | 8/1990 | Kostuck ................................... 359/15 |
| 5,101,193 | 3/1992 | Smith et al. .............................. 359/15 |
| 5,151,800 | 9/1992 | Upatnieks ................................. 359/34 |
| 5,164,848 | 11/1992 | Firth et al. ................................ 359/34 |
| 5,210,625 | 5/1993 | Moss et al. . |
| 5,224,198 | 6/1993 | Jachimowicz et al. .................... 359/15 |
| 5,237,434 | 8/1993 | Feldman et al. .......................... 359/15 |
| 5,278,008 | 1/1994 | Moss et al. . |
| 5,339,179 | 8/1994 | Rudisill et al. . |
| 5,420,761 | 5/1995 | Dunah et al. . |
| 5,515,184 | 5/1996 | Caulfield et al. ......................... 359/34 |
| 5,550,676 | 8/1996 | Ohe et al. . |
| 5,608,837 | 3/1997 | Tai et al. . |
| 5,641,219 | 6/1997 | Mizobe . |

*Primary Examiner*—Jon W. Henry
*Assistant Examiner*—Audrey Chang
*Attorney, Agent, or Firm*—Oblon, Spivak, McClelland, Maier & Neustadt, P.C.

[57] ABSTRACT

A waveguide hologram illumination system is based on thin substrate waveguides bearing a hologram on the surface through which light is diffracted out. A light source is optically coupled to the waveguide such that light emitted from the source is caused to propagate along the waveguide, being diffracted out at intersections with the surface of the waveguide on which the hologram is formed. The selective emission through the hologram can be advantageously used to illuminate display holograms or spatial light modulators. Provisions are made for rendering the amount of light emitted through the hologram uniform along the length of the hologram.

9 Claims, 5 Drawing Sheets

WAVEGUIDE HOLOGRAM ILLUMINATORS

This is a Continuation of application Ser. No. 07/902,881 filed on Jun. 23, 1992, now U.S. Pat. No. 5,515,184 which is a continuation-in-part of U.S. patent application Ser. No. 07/790,516 filed Nov. 12, 1991, now abandoned. The entire disclosure of the parent application is incorporated herein by reference.

FIELD OF THE INVENTION

This invention pertains to the use of waveguide holograms for use as illuminators of objects having specific illumination requirements. In particular, objects having special illumination requirements, such as display holograms or spatial light modulators can be illuminated with waveguide holograms as disclosed herein.

BACKGROUND OF THE PRIOR INVENTION

In applicants' parent application Ser. No. 07/790,516, waveguide holograms are disclosed, based on the use of thin substrate waveguides. These waveguides are characterized the relationship between the width w of an incident laser beam coupled onto an optical waveguide having a thickness t. This relationship is controlled by $\lambda$, where $\lambda$ is the wavelength of the incident lightwave. Thin substrate waveguides are characterized by $t \gg \lambda$. In this situation, one can avoid difficulties encountered in coupling the optical source to the thin film waveguide, and allow for convenient white light illumination. At the same time, $t<w$, so that the illumination obtained uniform.

The inventors have now discovered that these thin substrate waveguides can be particularly used for situations requiring controlled illumination. There are a wide variety of situations which require illumination of an object in an controlled fashion. This is particularly the case where one seeks to illuminate a spatial light modulator (SLM) or hologram. Certain requirements present major difficulties for conventional illumination systems. Initially, illustrating with traditional illumination of a transmissive object (FIG. 1a) and a reflective object (FIG. 1b), conventional illuminators require a substantial amount of space to perform the transformation from the wavefront emitted by the light source to the one required on the object. This space usually contains several optical elements which are the origin for stability problems, alignment difficulties and obstruction of other light beams that may be required in the optical system. Second, for some illumination, it is desired not to flood the object to be illuminated with light. Rather, the illuminator seeks to pattern the light so it hits only in preselected areas. This can increase illuminator efficiency if the light is redirected, instead of simply being partially blocked. Additionally, if the light source is broad band, spectral filtering may be required. As one example of such a situation, illumination of holograms presents particular problems. Some may have their own built-in spectral filters, while others permit white light illumination. If incoherent light sources used, the filter provides the needed amount of spatial coherence, while if lasers are employed, the filter is required to clean up the coherent noise. Accordingly, it remains an object of those of skill in the art to provide a method for selectively illuminating demanding objects, such as holograms and spatial light modulators.

SUMMARY OF THE INVENTION

Applicants have discovered that thin substrate waveguides can be used to provide improved, controlled illumination of objects, including holograms and spatial light modulators. The illumination system can comprise a thin substrate waveguide optically coupled to a coherent light source, such as a laser. This illumination system provides extremely high diffraction efficiencies.

Non-uniformity of the diffracted wavefront in the direction of propagation can be compensated for by exposing a photographic emulsion to the beam without compensation. The photographic negative absorbs most where the beam is brightest, and therefore, upon subsequent illumination through the negative, the wavefront passing is uniform. In an alternative approach, the hologram of the waveguide hologram illuminator can be recorded non-uniformly, so that the reconstructed beam formed is uniform in intensity. Both corrections can be employed.

DETAILED DESCRIPTION OF THE INVENTION

This invention may be better understood by the following discussions, with reference to the Figures presented. The illumination system claimed herein is based on the waveguide hologram of the parent application incorporated herein. Thus, in essence, the illumination system comprises a light source which is optically coupled to a waveguide, on a surface of which is formed a hologram, which can be displayed or used to illuminate, selectively, the object of interest. Herein, waveguide holograms are referred to as WGH.

Figure 1A:
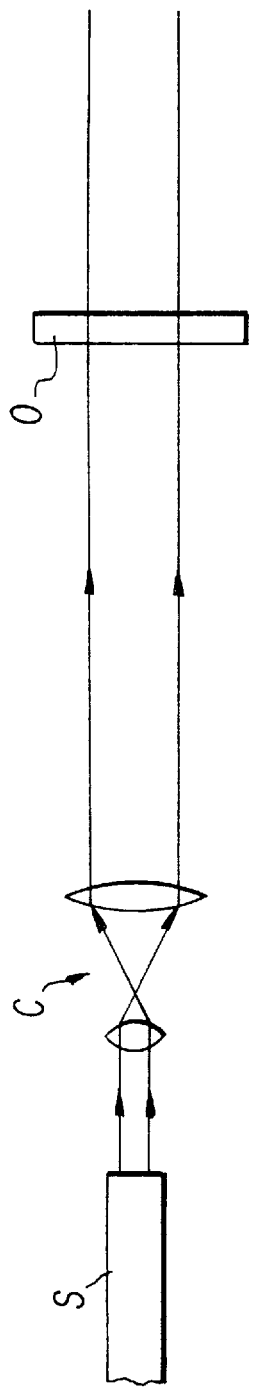
FIG. 1a and 1b are illustrations of prior art illumination systems for transmissive and reflective objects respectively.
Figure 1B:
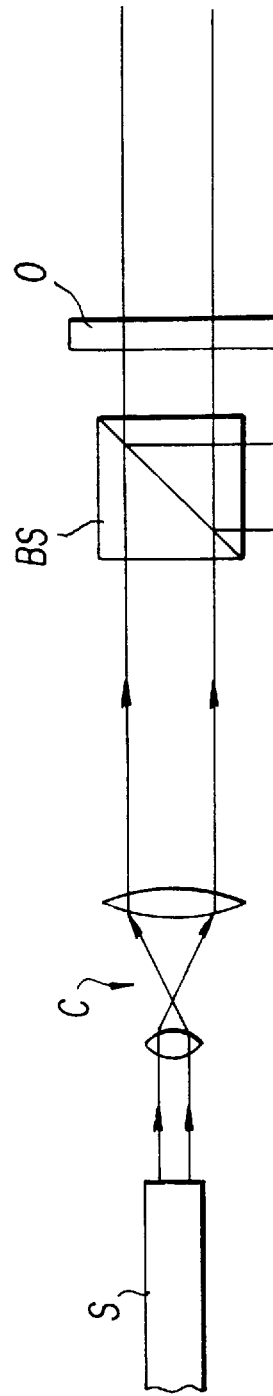
Figure 2A:
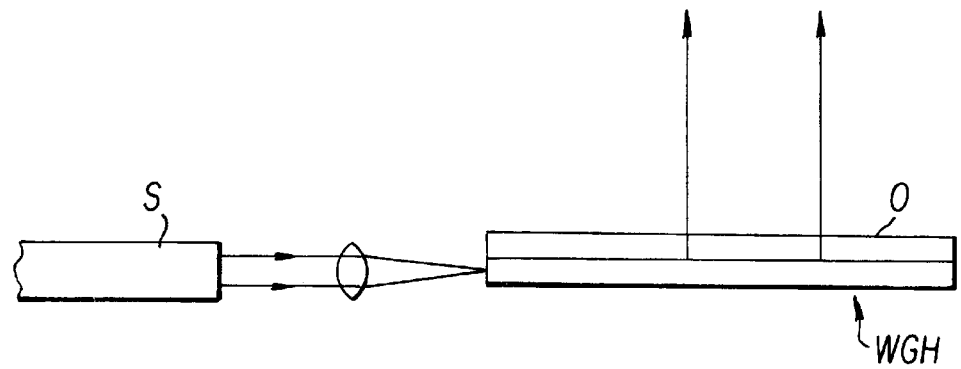
FIG. 2(a)(b) is an illustration of a thin substrate waveguide optically coupled to a light source.
Figure 2B:
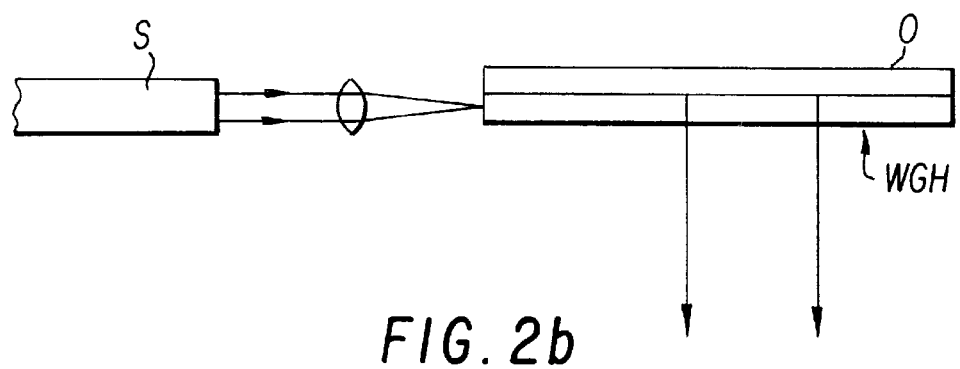

WGHs are normally flat and can be optically contacted to the objects they illuminate as indicated by the diagrams of FIG. 2. Thus the relatively complicated systems of FIG. 1 are replaced by compact, rugged arrangements. Mutual alignment is easily maintained and reflection losses at the air-glass interfaces are readily reduced by index matching oil or optical cement.

Figure 3:
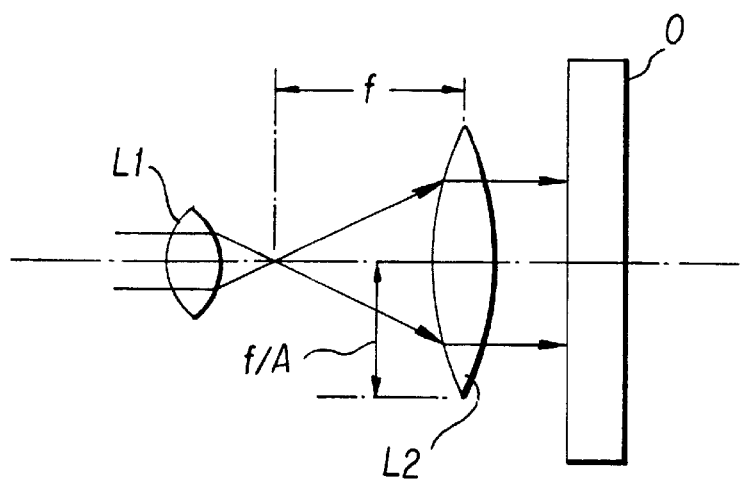
FIG. 3 is an illustration of the volume occupied by conventional lens systems.

Comparing with a conventional lens illumination system, the WGH illuminator occupies much less space. Shown in FIG. 3, a conventional lens illumination system occupies a volume approximately $$V_1 \cong \frac{\pi f^3 (1 + 1/M)}{4A^2}$$

wherein f is the focal length of the main lens, A is the numerical aperture, and M is the magnification of the collimator. For reflective spatial light modulators or SLMs, the volume for the illuminators increases to $$V_{R1} \cong V_1 + \left(\frac{f}{4A}\right)^3$$

On the other hand, the active volume for a WGH illuminator is no more than $$V_{W1} \cong \frac{f^2(1 + 1/M)(1 + 1/2A)h}{2A}$$

where is the thickness of the waveguide substrate. Usually h<<f. Taking the ratio of V, to $V_{wi}$, we obtain the gain of a WGH illuminator as $$K \cong \frac{\pi f}{h(1 + 1/2A)} >> 1$$

The diffraction efficiency, n, is the fraction of the light from the illuminating source which is diffracted into the required beam. For conventional display holograms, n=0.6 is sometimes obtained and for holograms made by two plane waves n=0.99 is attainable. WGH illuminators can, in principle, also achieve very high diffraction efficiency (of order approaching 0.99), however, high efficiencies over large area holograms requires very careful design as will be discussed below.

For purposes (minimizing noise, making viewers comfortable, etc.) what is more important than just the efficiency is the absence of stray light propagating forward the observer. From this point of view WGHs are ideal. The undiffracted light from a WGH illuminator never enters the instrumentation or the eye of the viewer due to the total internal reflection at the waveguide surfaces. Let the diffracted light have irradiance Hd and the undiffracted light leaving the hologram be $H_u$. Then $$\epsilon = \frac{H_d - H_u}{H_d + H_u}$$

for display holograms can approach 0.25. For holographic recording of two plane waves, E an approach 0.99, while for all types of WGH E≧0.999 is routinely achievable since the undiffracted light is trapped in the waveguide.

Along with the advantages of WGHs as illuminators, there are some penalties that must be paid. With a laser illuminated single-mode waveguide hologram, alignment of the laser beam is critical. This can lead to certain lack of ruggedness. Because light enters one side of the waveguide hologram and travels to the other, there is a time delay across the hologram. If we try to use a waveguide hologram for clock distribution, this builds in a clock skew. If we use the waveguide hologram as a way to produce spatially-coherent illumination beam, we must be sure that the temporal coherence time of the source exceeds this time delay. Another way of saying this is that source temporal coherence manifests itself as spatial coherence in a waveguide hologram illuminator.

Figure 4:
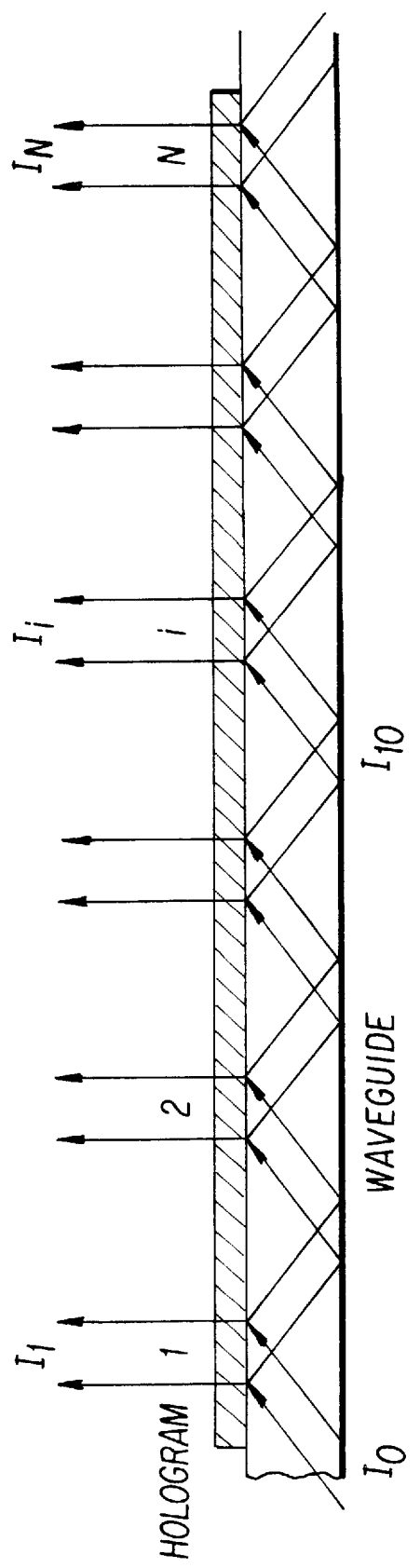
FIG. 4 is an illustration of repetitive diffraction of light out of a waveguide in the direction of propagation.

In addition, nonuniformity of the diffracted wavefront along the propagation direction is inevitable unless combated. Light diffracted out of the waveguide at one point is simply not available for diffraction at a later point. This aspect of the WGH illumination process is shown in FIG. 4. Assume the guided illumination beam is collimated. When it reaches the area where a hologram is placed, the beam encounters the region 1 of the hologram first. Part of light is diffracted as the reconstruction of the image, and the rest of light reflected. After the total internal reflection at the other waveguide surface, the residual light illuminates the region 2 on the hologram and undergoes the second reconstruction. This process repeats until the illumination beam passes the hologram area. Because WGHs have this unusual reconstructive mechanism, it is necessary to distinguish two different types of diffraction efficiencies. Assume the initial intensity of the illumination beam in FIG. 4 is $I_o$, and the intensities of diffracted light from region 1,2 . . . , N are $I_1$, $I_2$, . . . , $I_n$ respectively, then the global diffraction efficiency of the WGH is defined as $$\eta_G = \frac{\sum_{i=1}^{N} I_i}{I_0},$$

On the other hand, the local diffraction efficiency in the region i is defined as:

$$\eta_{Li} = \frac{I_i}{I_{i0}},$$

where $I_{io}$ is the intensity of the illumination beam immediately before entering the hologram region i. For conventional holograms, the global and the local diffraction efficiencies are equal because N=1.

If the hologram is recorded uniformly, that is $n_{L1}=n_{L2}=\ldots=N_{Li}=\ldots=n_{LN}=N$, then $$I_i = I_o \eta (I - \eta)^{i-1}$$

Substitute Eq. 8 to Eq. 6, the global efficiency is expressed as:

$$\eta_G I - (I - \eta)^N.$$

by plotting I, vs. i as shown in FIG. 4, we see that the holographic image is not reconstructed uniformly if all the local efficiencies are the same, i.e., the hologram is recorded uniformly. This problem may be called illumination depletion.

Moreover, a WGH tends to produce two diffracted beams, one out of each side. For display holograms, this can be an advantage. However, for illuminator holograms, it is not easy to use both beams and the unutilized beam reduces the useful efficiency and may introduce noise into the system.

Additionally, if light enters the waveguide by diffraction at some angle to the waveguide and exits via the hologram at any angle other than the angle or its opposite, light dispersion results. Thus, an input of white light results in a spectral output. This can be redressed by providing an input grating or hologram diffractor with an output direction equal or opposite to the angle of the hologram output. Both diffraction events are dispersive, but collectively they cancel.

Figure 7:
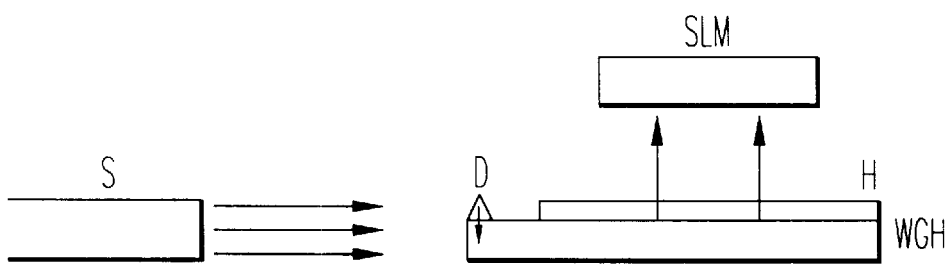
FIG. 7 is a schematic representation of an illumination system according to the invention wherein a light source is directed through a diffraction means into the waveguide hologram and out through a hologram to illuminate a spatial light modulator.

Such a system is illustrated in FIG. 7, wherein a light source S impinges on the waveguide hologram WGH through an input grating or diffraction means D. Light is emitted through the hologram H, illuminating a spatial light modulator SLM.

Aligning sensitivity can be combatted in two ways. First, we can attached the source, such as a diode laser, firmly to the edge of the waveguide or to the input of an input coupler or to an optical fiber which is itself firmly attached to the optical input couplers. Second, we can use a spatially and spectrally broad source and allow the waveguide to select out the portion of the available light which is properly matched to it. A WGH can achieve high spectral selectivity about 2–5A due to its double selection by the hologram and the waveguide.

Compensating for illumination depletion can be done a priori or a posteriori. A posteriori compensation is very light inefficient. Basically, we may expose a photographic emulsion to the uncompensated beam. A photographic negative of that pattern absorbs most where the beam is brightest and, therefore, uniformizes the wavefront passing through it. The a priori approach records the hologram nonuniformly so that the reconstructed beam is uniform. To derive an appropriate nonuniform beam to record, we illuminate uniformly through the photographic negative just described. For extremely high uniformity, we might follow a priori compensation with a posteriori compensation which can now be highly efficient because it is making only small corrections.

The problem of two-sidedness has a variety of potential solutions. We can absorb the light emerging from one side by an absorbing paint applied carefully not to damage the waveguide property of the guide. The other side will still be useful for transillumination. We can also place a mirror on one side to reflect all of the light into the same direction. Another solution is using off-axis illumination leading to an off-axis secondary beam keeping it from entering the illuminated optical system.

If we are illuminating SLMS, new possibilities arise. We can diffract out only polarized light and use the SLM to modulate the polarization. We can then use polarization analyzers to control or block the unmodulated light. With very precise reflective systems, using phase modulation, we can cause selective constructive and destructive interference between the directly emitted beam and the reflected beam.

Figure 5:
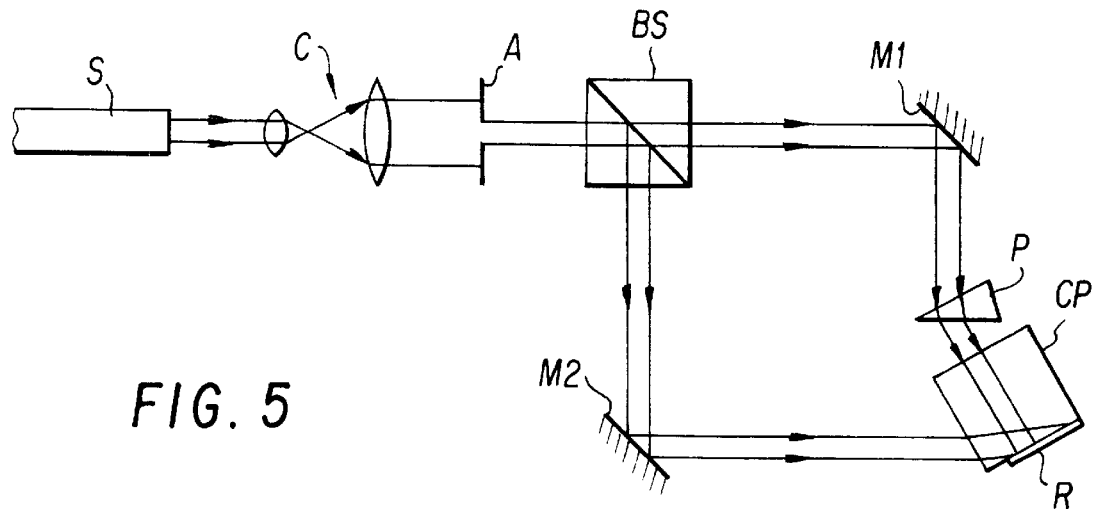
FIGS. 5 and 6 are schematic representations of recording systems used to record a waveguide hologram grating to prepare the illuminator of the claimed invention.
Figure 6:
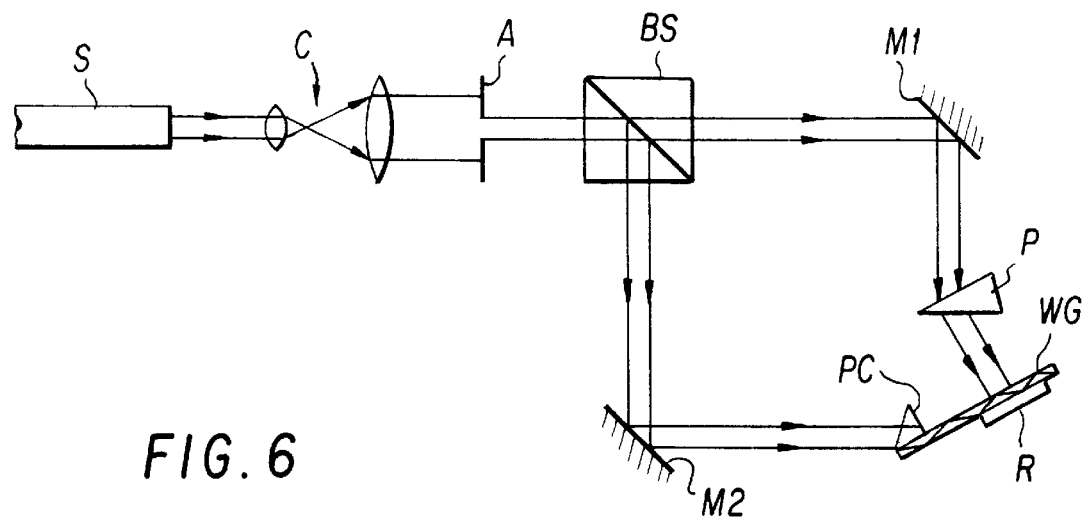

Two basic architectures were used in our experiments to record the WGH grating. The first configuration is a modified conventional holographic recording system (FIG. 5). A cubic glass prism, CP, is employed to create a reference beam with very steep incidence angle. The recording plate, R, is optically contacted with CP by index matching. The second configuration (FIG. 6) is suitable for the waveguides with more stringent requirements. In this configuration the reference beam is coupled into the waveguide by a prism coupler, PC, and can be exactly reproduced for reconstruction. All holograms discussed in this communication were recorded on silver halide plates (Agf a 8E75) and bleached. The recording medium was optically contacted to a thin substrate glass waveguide with index matching oil.

A SLM was illuminated by a white light illuminator which was recorded using the system of FIG. 5. In these experiments a plastic fiber ribbon was used to couple the light from a remote source indicating the convenience and flexibility of such illuminators. The color of the diffracted illuminating light depends, in this configuration, on the viewing angle. However, if a diffuser is placed between the SLM and the WGH, the colors are angularly mixed to reproduce the white illumination of the source at all angles. Illuminating the hologram by coherent laser light generated a coherent illumination beam suitable for reconstructing a 3-D holographic image.

The quality of the reconstructed beams was analyzed from various points of view qualitatively and also quantitatively. Particular emphasis was placed on polarization and phase characteristics. A slight nonuniform depolarization was observed by using an imaging polarimeter. The origin of this depolarization and its nonuniformity is probably in some local strains and is still under investigation.

When a hologram recorded by the configuration of FIG. 5 is illuminated by a coherent wave, the wavefront is distorted by an essentially random phase distribution. To reconstruct a cleaner wavefront, the configuration of FIG. 6 must be employed. In our experiments about 10% of the light in the source was diffracted out into the +1 diffraction order with about 2% in the −1 (the other side of the waveguide). About 30% of the light was coupled out of the edge, scattered and absorbed. The remaining 58% was lost due to inefficient coupling.

The invention described above has been disclosed with reference to generic description and specific embodiments. Save for the limitations presented in the claims below, the examples set forth are not intended to be, and shall not be construed as, limiting in any way. In particular, selection of other light sources, objects for illumination and the like will occur to those of ordinary skill in the art without the exercise of inventive skill, and remain within the scope of the invention as claimed hereinbelow.

What is claimed is:

1. A holographic-based system for producing spatial intensity modulated distributions of light for illuminating an object, wherein said system comprises:

a thin substrate having first and second planar surfaces between which light is transmitted in a waveguided manner;

a light source optically coupled to said thin substrate for transmitting light along said thin substrate between said first and second planar surfaces in a waveguided manner; and a hologram embodied within a recording medium mounted on said first planar surface of said thin substrate;

and wherein said object is disposed adjacent said recording medium for modulating the spatial intensity of light illuminating said object;

said light being transmitted along said thin substrate between said first and second planar surfaces in a waveguided manner while a portion of said transmitted light is diffracted by said hologram so as to produce a distribution of emitted light from said hologram having substantially uniform spatial intensity characteristics over the region of said hologram corresponding to the regions of said object at which spatial intensity modulation occurs.

2. The holographic-based illumination system of claim 1, wherein said thin substrate has an edge surface, and said light source is optically coupled to said edge surface.

3. The holographic-based illumination system of claim 1, which further comprises means associated with said first surface, for coupling said light source to said thin substrate.

4. The holographic-based illumination system of claim 1, wherein said light source is a laser.

5. The holographic-based illumination system of claim 1, wherein said light source is a white light producing source.

6. The holographic-based illumination system of claim 1, wherein said object is a spatial light modulation panel adjacent said hologram, for modulating the spatial intensity of light illuminating said object.

7. The holographic-based illumination system of claim 6, which further comprises a diffuser disposed between said hologram and said spatial light modulation panel, for improving the viewing angle of said spatial light modulation panel.

8. The holographic-based illumination system of claim 6, wherein said distribution of light produced from said hologram has a predetermined polarization state, and said spatial light modulation panel selectively modulates said predetermined polarization state of said light distribution.

9. The holographic-based illumination system of claim 1, wherein said object is a display hologram adjacent said hologram, for modulating the spatial intensity of light illuminating said display hologram.

* * * * *

UNITED STATES PATENT AND TRADEMARK OFFICE
CERTIFICATE OF CORRECTION

PATENT NO. : 5,854,697

DATED : December 29, 1998

INVENTOR(S): H. John CAULFIELD, et al.

It is certified that errors appear in the above-identified patent and that said Letters Patent is hereby corrected as shown below:

Column 3, line 18,   " n," should read --$\eta$,--.

line 20,   " n=0.6" should read --$\eta$=0.6--.

line 22    "n=0.99" should read --$\eta$=0.99--.

line 34,   "Hd" should read --$H_d$--.

line 41,   "E an" should read --$\epsilon$ can--.

line 42,   "WGH E$\geq$0.999" should read --WGH $\epsilon\geq$0.999--.

lines 59-60,   "combated." should read --combatted.--.

Column 4, lines 26-27,   "$n_{L1}=n_{L2}=\ldots=N_{Li}=\ldots=n_{LN}=N$, then"

should read --$\eta_{L1}=\eta_{L2}=\ldots=N_{Li}=\ldots=\eta_{LN}=N$, then--.

Column 5, line 22,   "SLMS" should read --SLMs--.

Signed and Sealed this

Second Day of November, 1999

Attest:

Q. TODD DICKINSON

Attesting Officer    Acting Commissioner of Patents and Trademarks